US006956693B2

(12) United States Patent
Yamaguchi

(10) Patent No.: US 6,956,693 B2
(45) Date of Patent: Oct. 18, 2005

(54) OPTICAL REPEATER HAVING INDEPENDENTLY CONTROLLABLE AMPLIFICATION FACTORS

(75) Inventor: Shohei Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 260 days.

(21) Appl. No.: 10/628,493

(22) Filed: Jul. 29, 2003

(65) Prior Publication Data

US 2004/0114213 A1   Jun. 17, 2004

(30) Foreign Application Priority Data

Jul. 30, 2002  (JP) .............................. 2002-221195

(51) Int. Cl.[7] .......................... H01S 3/00; H04B 10/02
(52) U.S. Cl. .................... 359/341.2; 398/173
(58) Field of Search ...................... 359/341.2, 341.32, 359/341.33; 398/173

(56) References Cited

U.S. PATENT DOCUMENTS 5,801,878 A  *  9/1998  Bourret et al. ......... 359/341.33

6,236,777 B1 * 5/2001 Ravasio et al. ................ 385/24
6,768,580 B2 * 7/2004 Okazaki ................... 359/341.2
6,894,831 B2 * 5/2005 Shieh et al. ........... 359/341.32

FOREIGN PATENT DOCUMENTS

WO    WO 2004/019458 A2 *  3/2004

* cited by examiner

Primary Examiner—Mark Hellner
(74) Attorney, Agent, or Firm—McGinn IP Law Group, PLLC

(57) ABSTRACT

An optical repeater includes: a first forward pumping coupler and a first backward pumping coupler inserted in an uplink optical fiber consecutively along the transfer direction of the optical signals therein; a second backward pumping coupler and a second forward pumping coupler inserted in a downlink optical fiber consecutively along the transfer direction of the optical signals therein; a first light source for supplying a pump light having a controlled power level to the first backward pumping coupler and the second forward pumping coupler; a second light source for supplying a pump light having a controlled power level to the first forward pumping coupler and the second backward pumping coupler. Each of the pumping couplers is a Raman amplifier.

12 Claims, 5 Drawing Sheets

OPTICAL REPEATER HAVING INDEPENDENTLY CONTROLLABLE AMPLIFICATION FACTORS

BACKGROUND OF THE INVENTION (a) Field of the Invention

The present invention relates to an optical repeater having independently controllable amplification factors and, more particularly, to an optical repeater for amplifying optical signals transmitted through a pair of optical fibers.

(b) Description of the Related Art

In an optical fiber communication system for transmitting optical signals, a plurality of signal amplifiers are provided as optical repeaters at a constant pitch for compensating the optical loss generated in the optical fiber. The signal amplifiers used in the optical fiber communication system are categorized into two types: an electric amplifier which converts the optical signal to an electric signal, amplifies the electric signal and re-converts the amplified electric signal into an optical signal; and an optical amplifier which amplifies the optical signal as it is.

In particular, the optical amplifiers are used as optical repeaters for an undersea optical cable because such optical repeaters are requested to have lower power dissipation. Known optical amplifiers include an optical fiber amplifier which uses an optical fiber having a core doped with rare earth elements, and a Raman amplifier which uses the principle of Raman scattering generated by radiating a pump light onto the optical fiber transmitting the optical signals to be amplified.

FIG. 6 shows a conventional optical repeater described in a publication entitled "Erbium-doped optical fiber amplifier" by Syouich Sudo in NTT Corp., published from Opto-Electronics Co. The optical repeaters i.e., optical fiber amplifier is used for amplifying uplink signal and downlink signal transferred through an optical fiber cable, and includes therein a wavelength-division-multiplexing (WDM) optical couplers 10, optical isolators 30, pump laser diodes (LD) 40, wavelength synthesis couplers 60, erbium-doped fibers (EDFs) 76, and a LD driver 75.

The optical isolators 30 are inserted in the uplink and downlink optical fibers 71 and 72 for suppressing the reflected light from transferring in the reverse direction. Pump laser diodes 40 emit pump lights having different central wavelengths of 1480-nm-band for amplifying the WDM optical signals. The LD driver 75 drives the pump laser diodes 40 while controlling the output powers of the pump laser diodes 40, thereby controlling the amplification factors of the optical signals transferred through the uplink and downlink optical fibers 71 and 72.

Both the optical couplers 60, i.e., tapping couplers 60 inserted in the uplink and downlink optical fibers 71 and 72 tap the optical signals then transferring through the uplink fiber 71 onto the downlink fiber 72, and tap the optical signals then transferring through the downlink fiber 72 onto the uplink fiber 71. This configuration allows the intensity of the optical signals transferring through the downlink fiber 72 to be monitored at the receiving end of the uplink fiber 71, and allows the intensity of the optical signals transferring through the uplink fiber 71 to be monitored at the receiving end of the downlink fiber 72.

The wavelength synthesis coupler 50 is a 2-input/2-output optical coupler, which couples together the pump lasers emitted to by two laser diodes 40 and outputs the coupled pump lasers to the EDFs 76 through both the WDM couplers 10 provided on the uplink and downlink fibers 71 and 72.

The EDF 76 is an optical fiber having a core doped with erbium ions, or rare-earth elements, and receives the pump light through the WDM coupler 10 to amplify the optical signals transferring through the optical fiber 71 or 72.

In order for broadening the band of the optical signals to be amplified, it is effective to increase the number of laser diodes 40 having different central wavelengths. For example, if the optical repeater has four laser diodes 40 having different central wavelengths, each two of the four diodes are paired, the outputs of each pair are coupled by a wavelength synthesis coupler, and the two coupled lasers are again coupled by another wavelength synthesis coupler. This allows a pump light obtained from four laser diodes to be supplied to the EDFs 76 through the WDM couplers 10. The WDM coupler 10 operates for backward pumping, wherein the pump light is introduced to the EDF 76 in the direction opposite to the transfer direction of the optical signals through the uplink or downlink fiber.

The optical repeater may be replaced by a Raman amplifier which uses the principle of Raman scattering in the optical amplification. In such a case, the pump light supplied from the WDM coupler 10 is directly introduced to the uplink and downlink fibers 71 and 72 without using the EDFs 76.

In a recent optical communication system, along with the development of the WDM technique and increase of the number of multiplexed wavelengths in the optical signals, the optical amplifier is ever requested to have a broader-band characteristic. For meeting such a request, intensive studies are conducted for developing the optical repeaters having Raman amplifiers using 1480-nm-band pump lasers.

The optical repeater used for the undersea optical cable should have a higher reliability in addition to the lower power dissipation. However, in the conventional optical repeater such as described in the publication, if the pump light is not supplied to one of the WDM couplers 10 which supplies the pump light to the uplink fiber 71, the optical signals transferring through the downlink fiber 72 cannot be also amplified. In other words, a single failure disables the functions of the optical repeater for amplifying the optical signals transferring through both the uplink and downlink fibers. This degrades the reliability of the conventional optical repeater.

In addition, the conventional optical repeater does not have different amplification factors independently controlled for the uplink fiber and the downlink fiber, because the WDM couplers 10 receive the optical outputs of the same output power from the wavelength synthesis coupler 50. For example, if optical repeaters are disposed in number of 200 to 250 at a pitch of 40 to 50 km for an optical fiber cable having a transmission length of 10,0000 km, there may arise an imbalance of the optical signal power between the receiving end of the uplink fiber and the receiving end of the downlink fiber.

In particular, if a Raman amplifier is employed as the optical amplifier, the amplification factor for the optical signal has a considerable range of variation due to the characteristics of the optical fiber etc. In such a case, there arises a problem in that the intensity and quality of the optical signal is lowered unless the amplification factors of the optical repeaters are suitably controlled for the respective uplink and downlink optical fibers.

SUMMARY OF THE INVENTION

In view of the above, it is an object of the present invention to provide an optical repeater capable of independently controlling the amplification factors for respective optical fibers and also preventing a single failure from causing a complete lost of the functions of the optical repeater, thereby improving the signal quality and reliability of the optical communication system.

It is another object of the present invention to provide an optical communication system including the optical repeater of the present invention and having improved reliability and suitable controllability.

The present invention provides a optical repeater including: a first backward pumping optical coupler and a first forward pumping optical coupler inserted in a first optical fiber transferring therethrough first optical signals; a second backward pumping optical coupler and a second forward pumping optical coupler inserted in a second optical fiber transferring therethrough second optical signals; a first light source for supplying a first pump laser having a first power level to the first backward pumping optical coupler and the second forward pumping optical coupler; a second light source for supplying a second pump laser having a second power level to the first forward pumping optical coupler and the second backward pumping optical coupler; and a driver for driving the first and second light sources to control the first power level and the second power level.

In accordance with the optical repeater of the present invention, power levels of the first and second optical signals transferring through the first and second optical fibers, respectively, can be controlled independently. In addition, the optical repeater has a redundancy in the pumping optical coupler for each of the first and second optical fibers, whereby a single failure does not necessarily result in a complete loss of the amplifying functions of the optical repeater.

The present invention also provides an optical communication system including a pair of terminal stations, an optical fiber cable connected between the terminal stations and including the first and second optical fibers, and at least one optical repeater of the present invention.

The optical communication system has advantages achieved by the optical repeater of the present invention.

The above and other objects, features and advantages of the present invention will be more apparent from the following description, referring to the accompanying drawings.

PREFERRED EMBODIMENTS OF THE INVENTION

Figure 1:
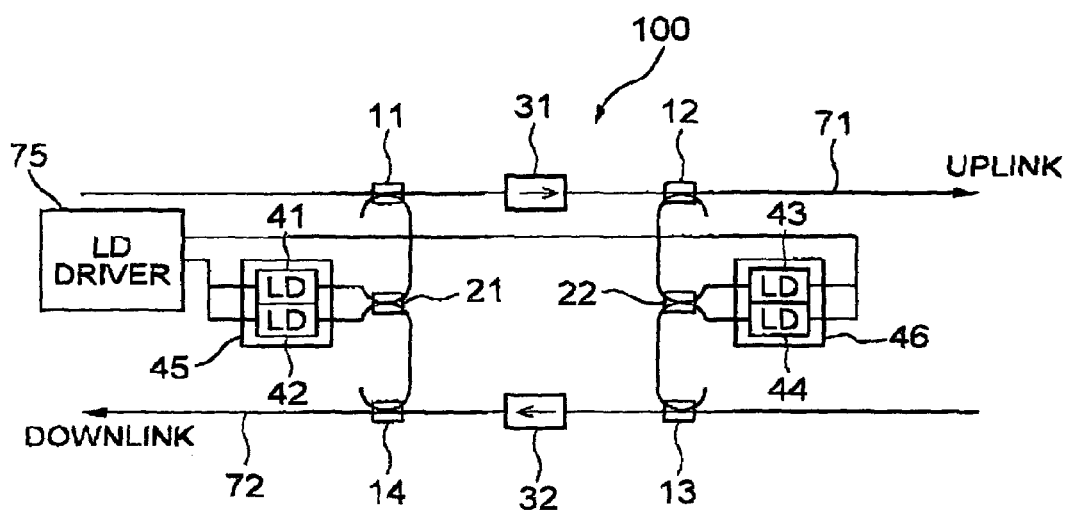
FIG. 1 is a block diagram of an optical repeater according to a first embodiment of the present invention.

Now, the present invention is more specifically described with reference to accompanying drawings, wherein similar constituent elements are designated by similar reference numerals throughout the drawings.

Referring to FIG. 1, an optical repeater, generally designated by numeral 100, according to a first embodiment of the present invention operates for Raman amplification of optical signals transferring through uplink fiber 71 and downlink fiber 72. The optical repeater 100 includes a first pump light source 45 including pump laser diodes 41 and 42, a second pump light source 46 including pump laser diodes 43 and 44, first and second 3-dB couplers 21 and 22, backward pumping WDM optical couplers 11 and 13, forward pumping WDM optical couplers 12 and 14, optical isolators 31 and 32, and a laser-diode (LD) driver 75.

In the present embodiment, each pair of the laser diodes 41 to 44 emit lasers to be coupled to a pump light, which is used for amplifying each WDM optical signal transferring through the uplink fiber 71 or downlink fiber 72. The LD driver 75 drives the laser diodes 41 to 44 and controls the output powers of the laser diodes 41 to 44.

More specifically, the first 3-dB coupler 21 couples together the lasers emitted by the laser diodes 41 and 42 in the first pump light source 45, and outputs the coupled lasers as a pump light to the backward pumping WDM coupler 11 disposed for the uplink fiber 71 and to the forward pumping WDM coupler 14 disposed for the downlink fiber 72. The level of the pump light supplied to the backward pumping WDM coupler 11 is equal to the level of the pump light supplied to the forward pumping WDM coupler 14. Similarly, the second 3-dB coupler 22 couples together the lasers emitted by the laser diodes 43 and 44 in the second pump light source 46, and outputs a pump light to the backward pumping WDM coupler 13 disposed for the downlink fiber 72 and to the forward pumping WDM coupler 12 disposed for the uplink fiber 71. The level of the pump light supplied to the forward pumping WDM coupler 12 is equal to the level of the pump light supplied to the backward pumping WDM coupler 13.

The backward pumping WDM couplers 11 and 13 pump the uplink fiber 71 and downlink fiber 72, respectively, in the backward directions opposite to the transfer directions of the optical signals in the fibers 71 and 72. Similarly, the forward pumping WDM couplers 12 and 14 pump the uplink fiber 71 and downlink fiber 72, respectively, in the forward directions equal to the transfer directions of the optical signals in the fibers 71 and 72. The backward pumping optical coupler 11 and the forward pumping optical coupler 12 are arranged consecutively along the transfer direction of the optical signals through the uplink fiber 71, and the backward pumping optical coupler 13 and the forward pumping optical coupler 14 are arranged consecutively along the transfer direction of the optical signals through the downlink fiber 72. The optical isolators 31 and 32 are inserted in the uplink fiber 71 and downlink fiber 72, respectively, between the respective backward pumping WDM couplers and the respective forward pumping WDM couplers for suppressing the backward transmission of the optical signals through the fibers 71 and 72.

The laser diodes 41 to 44 have central wavelengths within the 1480-nm band for obtaining the Raman scattering. The laser diodes 41 to 44 have different emission wavelengths to suppress the output power fluctuation generally caused by interference between the lasers, and thereby broaden the amplification band within which a higher gain is achieved in the Raman amplification. In the uplink fiber 71, the optical signal amplified by the backward pumping WDM coupler 11 passes through the optical isolator 31 to be amplified again by the forward pumping WDM coupler 12. Similarly, in the downlink fiber 72, the optical signal amplified by the backward pumping WDM coupler 13 passes through the optical isolator 32 to be amplified again by the forward pumping WDM coupler 14.

Figure 2:
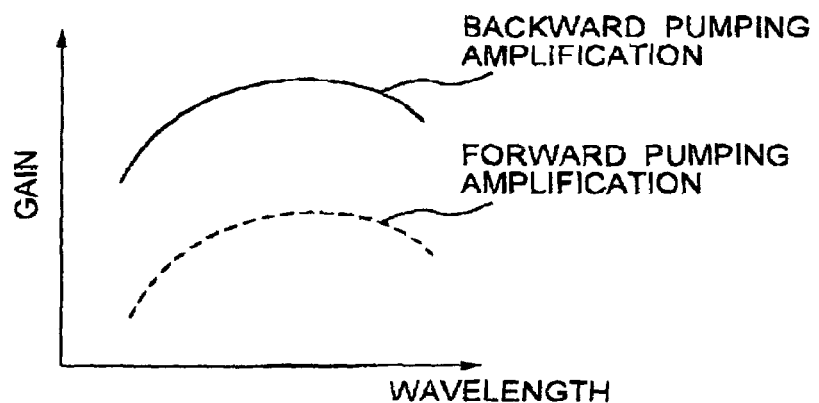
FIG. 2 is a graph showing the general relationship between the wavelength of the pump laser and the gain of the Raman amplification.

Referring to FIG. 2 showing the general relationship between the gain of the Raman amplification and the wavelength of the optical signal, wherein the solid line and dotted line correspond to the forward pumping amplification and backward pumping amplification, respectively, with the power of the pumping laser being fixed. In the Raman amplification, the optical signal having a wavelength 100 nm longer than the central wavelength of the pump light is amplified. As understood from FIG. 2, the backward pumping amplification achieves a higher gain than the forward pumping amplification so long as the power level of the pump light is fixed.

For controlling the amplification factors of the optical signals in the uplink fiber 71 and downlink fiber 72, the LD driver 75 independently controls the output power levels of the first pump light source 45 and the second pump light source 46. If the amount of change of the output power from the first pump light source 45 is controlled to be equal to the amount of change of the output power from the second pump light source 46, both the amplification factors in the uplink fiber 71 and the downlink fiber 72 are changed while assuming the same amount of change. On the other hand, if the amount of change of the output power from the first pump light source 45 is controlled to be different from the amount of change of the output power from the second pump light source 46, the amplification factors in the uplink fiber 71 and the downlink fiber 72 are controlled independently.

For example, if the LD driver 75 controls the pump light sources 45 and 46 so that the output powers of the first pump light source 45 and the second pump light source 46 are raised and lowered, respectively, the amount of change in the amplification factor of the optical signal ill the uplink fiber 71 is different from the amount of change in the amplification factor of the optical signal in the downlink fiber 72. This is because the gain of the forward pumping amplification is different from the gain of the backward pumping amplification. In this case, if the amount of increase, in the output power of the first pump light source 45 is equal to the amount of decrease in the output power of the second pump light source 46, the amount of increase in the gain of the backward pumping WDM coupler 11 is larger than the amount, of decrease in the, gain of the forward pumping WDM coupler 12 in the uplink fiber 71. This results in an increase in the amplification factor of the optical signal in the uplink fiber 71. In contrast, since the amount of decrease in the gain of the backward pumping WDM coupler 13 is larger than the amount of increase in the gain of the forward pumping WDM coupler 14, the amplification factor of the optical signal in the downlink fibber 72 is reduced.

In an alternative, the amplification factor for one of the optical signals in the uplink and downlink fibers 71 and 72 may be changed, with the other of the optical signals in the uplink and downlink fibers 71 and 72 being fixed. For example, by controlling the outputs of the first and second pump light sources 45 and 46 so that the increase in the gain of the backward pumping WDM coupler 13 in the downlink fiber 72 equals to the amount of decrease in the gain of the forward pumping WDM coupler 14, the amplification factor of the optical signal in the uplink fiber 71 can be changed, with the amplification factor of the optical signal in the downlink fiber 72 being fixed.

In the above configuration of the present embodiment, the optical repeater 100 has a redundant configuration, wherein both the optical signals in the uplink and downlink fibers 71 and 72 are subjected to the backward and forward pumping by using the Raman amplification. Thus, if the first pump light source 45 is failed for some reason, the second pump light source 46 can be used for optical amplification of the optical signals, thereby improving the reliability of the optical repeater 100 as well as the optical communication system. The optical repeater 100 of the present embodiment can be suitably used for the undersea optical cable, which requires a highest degree of reliability of the system components.

In the control of the amplification factors of the optical signals in the uplink and downlink fibers 71 and 72, the optical repeater 100 takes advantage of the difference in the gain between the backward pumping amplification and the forward pumping amplification in the Raman amplifier. By designing the central wavelengths of the laser diodes 42 to 44 at different wavelengths, the interference between the pump lasers can be prevented while broadening the amplification band of the optical signal to be amplified by the optical repeater 100.

Figure 6:
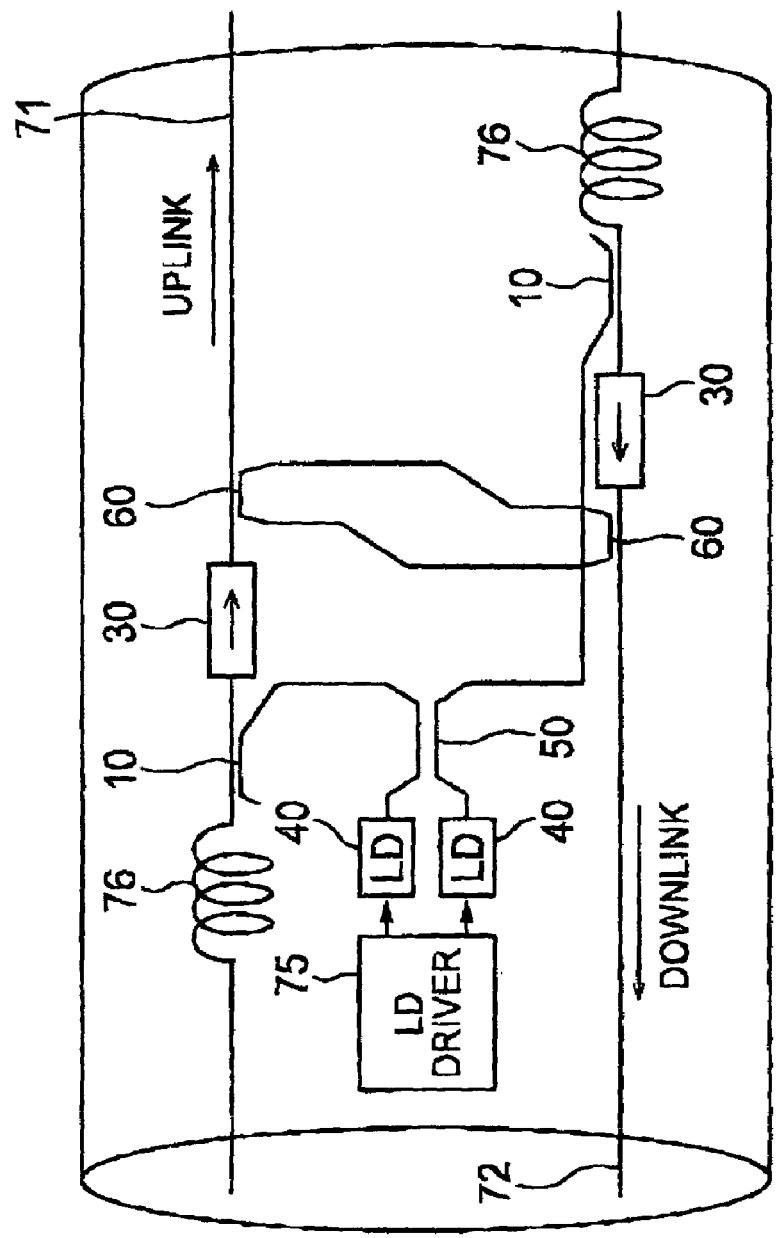
FIG. 6 is a block diagram of a conventional optical repeater.

It may be possible in the conventional optical repeater shown in FIG. 6 that the optical repeater has four laser diodes for broadening the amplification band, with each two of the laser diode being paired by using a wavelength synthesis coupler similar to that shown in FIG. 6. In this case, since one of the outputs of each of the wavelength synthesis couplers for paring is not coupled to the WDM optical coupler 60, the one of the outputs must be provided with a suitable optical component for suppressing the interference and reflection of the laser. On the other hand, the optical repeater 100 of the present embodiment needs not such an optical component.

Figure 3:
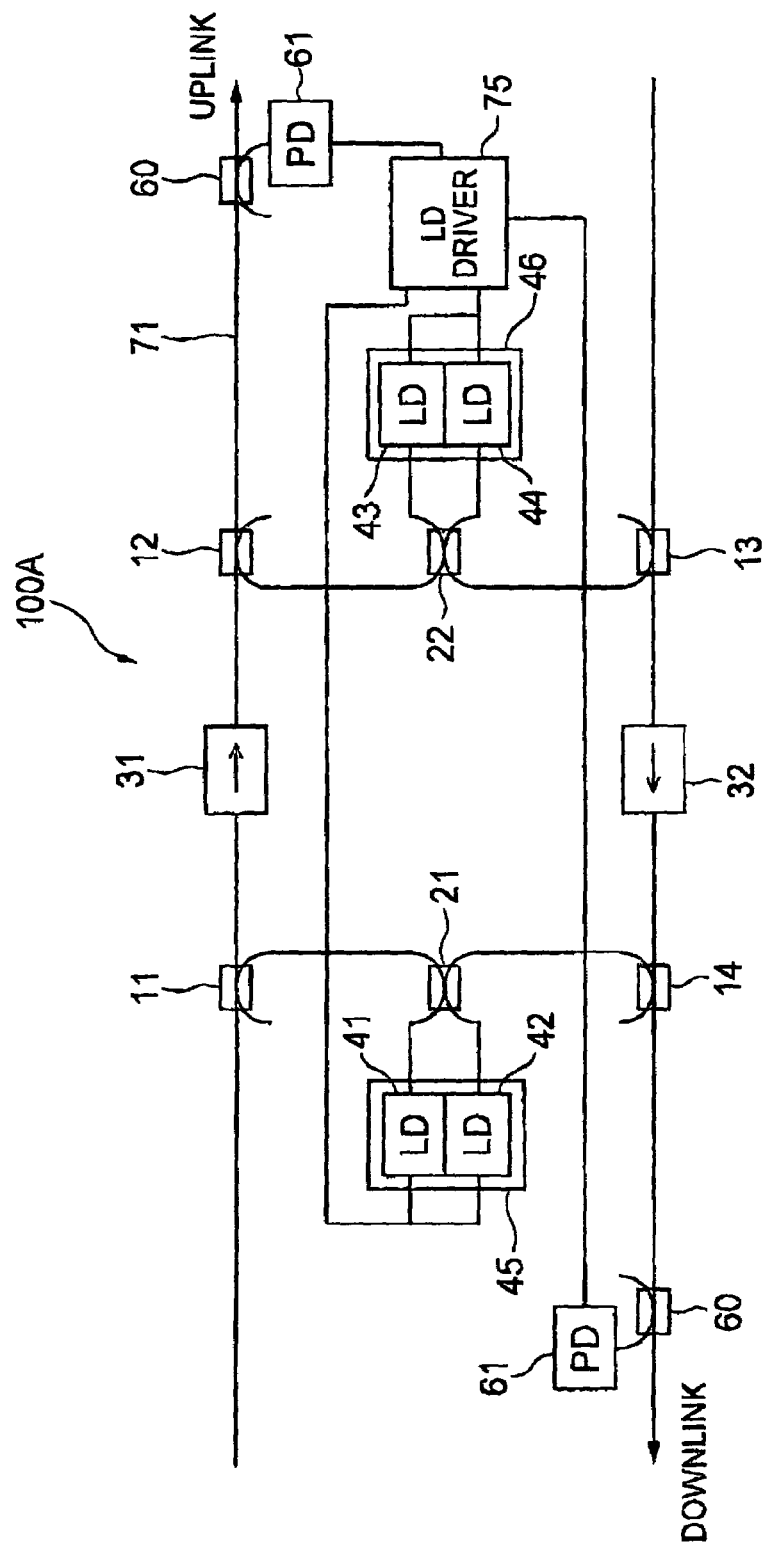
FIG. 3 is a block diagram of an optical repeater according to a second embodiment of the present invention.

Referring to FIG. 3, an optical repeater, generally designated by numeral 100A, according to a second embodiment of the present invention is similar to the first embodiment except that an optical coupler 60 and a photodiode 61 are provided for each of the uplink fiber 71 and downlink fiber 72, and that the output of the photodiode 61 controls the LD driver 75 to control the output powers of the laser diodes 41 to 44 at desired levels, in the present embodiment.

More specifically, the optical coupler, or tapping coupler 60 provided for each of the uplink and downlink fibers 71 and 72 branches out, or taps out, part of the optical signal from the corresponding optical fiber. The part of the optical signal thus tapped is input to the photodiode 61, which converts the optical signal into an electric signal. The LD driver 75 detects the level of the optical signal in each of the uplink and downlink fibers 71 and 72 based on the output from the photodiode 61. The LD driver 75 controls each of the pump lights from he first and second pump light sources 45 and 46 at a specified level based on the detected level of the optical signal in the uplink and downlink fibers 71 and 72. This allows outputs of the pump light sources 45 and 46 to control the amplification factors of the optical signals in the uplink and downlink fibers 71 and 72 at desired levels.

The optical repeater 100A of the present embodiment can control the power of the optical signals at desired levels even if the gain of the optical amplifier varies due to the variation in the optical characteristics of the components of the optical repeater 100A or optical fibers 71 and 72 for the Raman amplification.

Figure 4:
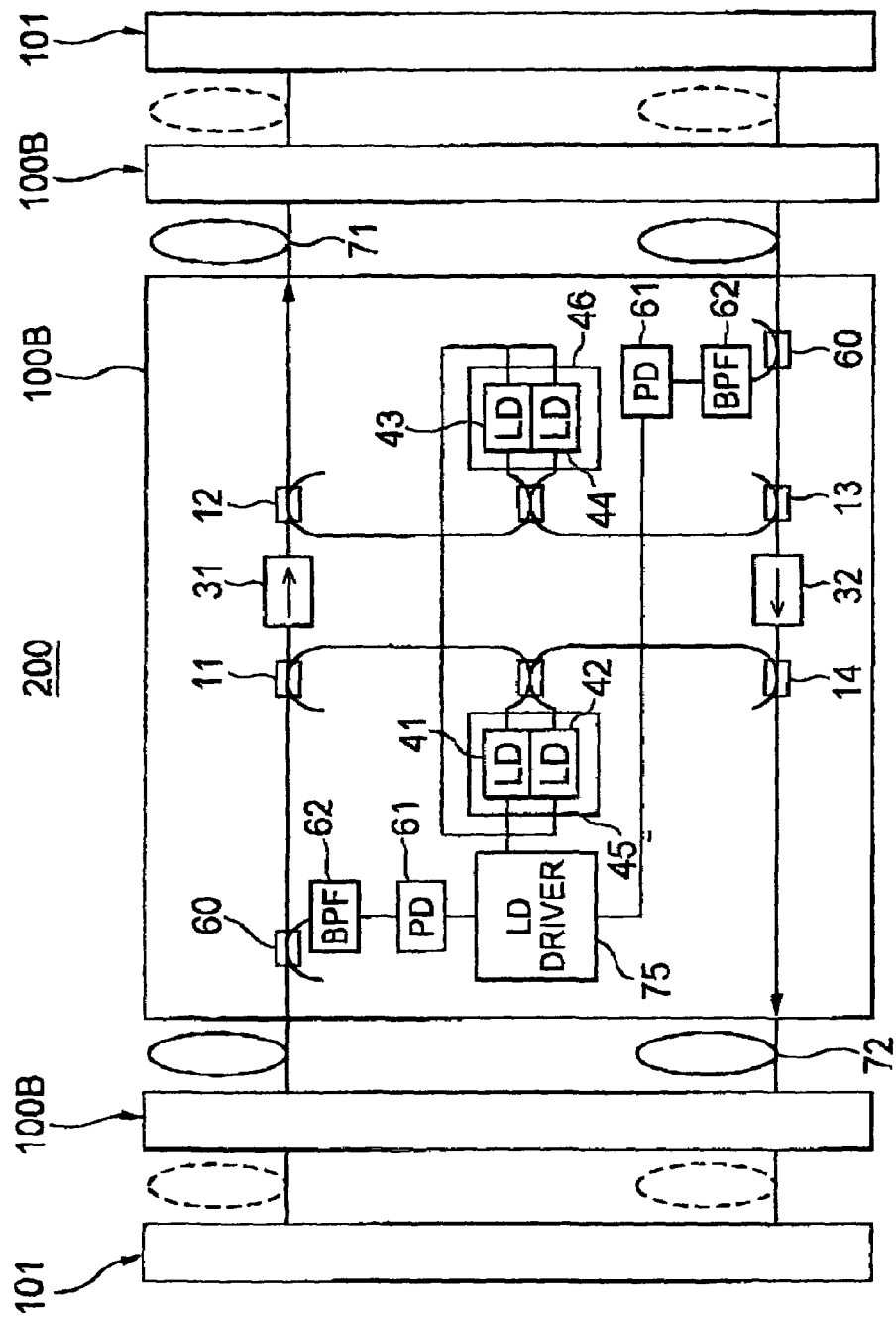
FIG. 4 is a block diagram of an optical repeater according to a third embodiment of the present invention.

Referring to FIG. 4, there is shown an optical communication system, generally designated by numeral 200, including a plurality of optical repeaters 100B according to a third embodiment of the present invention. The optical repeaters 100B are disposed at a constant pitch along the optical fibers 71 and 72. The optical repeater 100B shown therein is similar to the optical repeater 100A of the second embodiment except that a band-pass-filter 62 is interposed between the tapping coupler 60 and the photodiode 61 for passing a control signal supplied from each of the terminal stations 101 through the optical fibers 71 and 72, and that the LD driver 75 is controlled by the control signal having a specified wavelength, in the present embodiment.

More specifically, the optical communication system 200 includes an optical fiber cable including uplink fiber 71 and downlink fiber 72, a plurality of optical repeaters 100B inserted in the optical fiber cable at a constant pitch, and terminal stations 101 connected to the terminals of the optical fibers 71 and 72 for transmitting/receiving optical signals through the optical fiber cable. The terminal station 101 transmits control signals to the optical repeaters 100B for controlling the same independently of each other. The control signal has one of multiplexed wavelengths, as described hereinafter.

Figure 5A:
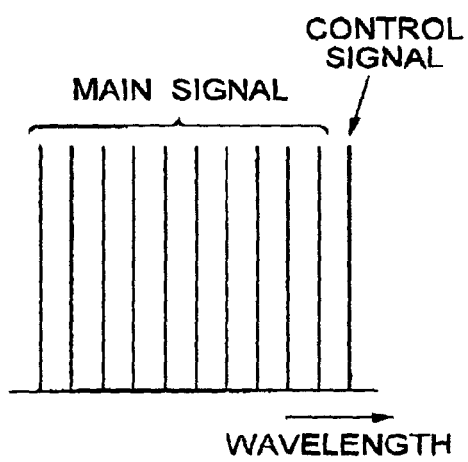
FIG. 5A is a spectrum diagram of the optical signal transferring through a transmission line.
Figure 5B:
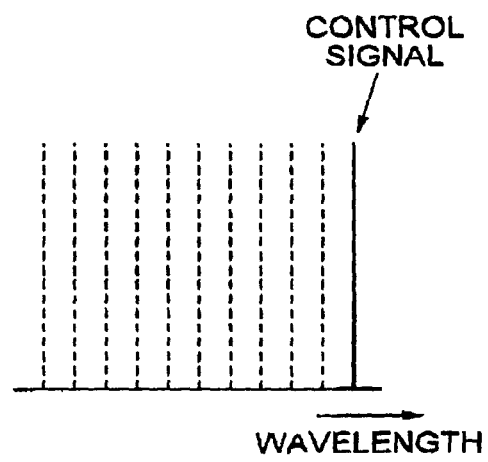
FIG. 5B is a spectrum diagram of the optical signal passed by a band-pass filter.

FIGS. 5A and 5B are spectrum diagrams showing the optical signal transferring through the uplink fiber 71 or downlink fiber 72 and the optical signal passed by the band-pass-filter 62, respectively. Each terminal station 101 transmits the optical signal having the spectrum shown in FIG. 5A, including a plurality of main signal components and a control signal component having different wavelengths.

The tapping coupler 60 taps out part of the optical signal from the optical fiber 71 or 72 to the band-pass-filter 62, which passes the control signal component to the photodetector 61 while blocking the main signal components, as shown in FIG. 5B. The output of the photodetector 62 including the control signal component supplied from the terminal station 101 controls the optical repeater 100B, which in turn controls the output powers of the pump light sources 45 and 46.

In the present embodiment, the terminal station 101 controls the output power of the pump light source 45 or 46 based on the power level of the optical signal received by the own station 101, thereby maintaining the received optical power at a desired level.

Although the present embodiment is described for an example using the Raman amplifier as the optical amplifier, the optical amplifier may be an optical fiber amplifier including an optical fiber having a core doped with rare earth elements, such as an erbium-doped optical fiber. The number of pump laser diodes in each of the pump light sources may be selected as desired, including one. It is preferable, however, to dispose a plurality of pump laser diodes having different central wavelengths in each pump light source. In the above embodiment, the laser diodes have central wavelengths within the 1480-nm band; however, the laser diode may have central wavelengths in the range between around 1400 nm and around 1500 nm, for example.

In the second embodiment, the tapping coupler 60 is inserted in the optical fiber at the upstream (or input side) of the optical repeater 100A for converting the intensity of the optical signal into an electric signal; however, the tapping coupler 60 may be disposed at the downstream of the optical repeater 100A alone or in combination of another optical repeater disposed at the upstream.

In addition, it is not necessary to use a single type of the optical repeaters in an optical communication system. For example, the optical repeater 100 of the first embodiment and the optical repeater 100A of the second embodiment may be inserted alternately in the optical fiber cable, whereby the signal power level is controlled by every other optical repeater. Such a configuration may be applied to another combination of the optical repeater 100A of the second embodiment and the optical repeater 100B of the third embodiment, for example.

In the third embodiment, the control signal component is included in the optical signal for controlling the optical repeater; however, the optical repeater may be controlled by using another suitable control signal such as an electric signal. Independent control of optical repeaters may be conducted by using dedicated control signals for the respective optical repeaters in the system while specifying IDs of the optical repeaters.

Since the above embodiments are described only for examples, the present invention is not limited to the above embodiments and various modifications or alterations can be easily made therefrom by those skilled in the art without departing from the scope of the present invention.

What is claimed is:

1. An optical repeater comprising:
   a first backward pumping optical coupler and a first forward pumping optical coupler inserted in a first optical fiber transferring therethrough first optical signals;
   a second backward pumping optical coupler and a second forward pumping optical coupler inserted in a second optical fiber transferring therethrough second optical signals;
   a first light source for supplying a first pump light having a first power level to said first backward pumping optical coupler and said second forward pumping optical coupler;
   a second light source for supplying a second pump light having a second power level to said first forward pumping optical coupler and said second backward pumping optical coupler; and
   a driver for driving said first and second light sources to control said first power level and said second power level.

2. The optical repeater according to claim 1, wherein each of said first and second light sources comprises a plurality of laser diodes having different emission wavelengths.

3. The optical repeater according to claim 2, wherein each of said laser diodes of said first and second light sources has a central emission wavelength different from central emission wavelength of any of the others of said laser diodes of said first and second light source.

4. The optical repeater according to claim 1, wherein said driver controls at least one of said first and second power levels based on a power level of said first optical signals and/or a power level of said second optical signal.

5. The optical repeater according to claim 1, wherein said first backward pumping optical coupler and said first forward pumping optical coupler are arranged consecutively along a transfer direction of said first optical signals, and said second backward pumping optical coupler and said second forward pumping optical coupler are arranged consecutively along a transfer direction of said second optical signal.

6. The optical repeater according to claim 5, further comprising a first optical isolator interposed between said first backward pumping optical coupler and said first forward pumping optical coupler, and a second optical isolator interposed between said second backward pumping optical coupler and said second forward pumping optical coupler 7. The optical repeater according to claim 1, wherein each of said pumping optical couplers is a Raman amplifier.

8. The optical repeater according to claim 7, wherein said driver controls said first and second power levels so that amplification factors of said first and second optical signals by said optical repeater change independently of each other.

9. The optical repeater according to claim 7, wherein said driver controls said first and second power levels so that amplification factors of said first optical signals and said second optical signals by said optical repeater are fixed and changed, respectively.

10. The optical repeater according to claim 1, wherein each of said first and second optical fibers includes therein a rare earth doped fiber, and each of said pumping optical couplers introduces said first or second pump light to said rare earth doped fiber.

11. The optical repeater according to claim 1, wherein said driver controls at least one of said first and second power levels based on a control signal component included in said first and/or second optical signals 12. The optical repeater according to claim 1, wherein said first and second optical fibers are uplink and downlink fibers, respectively.

* * * * *